United States Patent
Letas

(10) Patent No.: US 8,106,525 B2
(45) Date of Patent: Jan. 31, 2012

(54) WIND ENERGY INSTALLATION WITH AN AUTONOMOUS ENERGY SUPPLY FOR A BLADE ADJUSTMENT DEVICE

(75) Inventor: Heinz-Hermann Letas, Süsel (DE)

(73) Assignee: REpower Systems AG, Hamburg (DE)

( * ) Notice: Subject to any disclaimer, the term of this patent is extended or adjusted under 35 U.S.C. 154(b) by 582 days.

(21) Appl. No.: 12/304,725

(22) PCT Filed: Jun. 12, 2007

(86) PCT No.: PCT/EP2007/005180
§ 371 (c)(1),
(2), (4) Date: Dec. 12, 2008

(87) PCT Pub. No.: WO2007/144146
PCT Pub. Date: Dec. 21, 2007

(65) Prior Publication Data
US 2009/0243296 A1    Oct. 1, 2009

(30) Foreign Application Priority Data
Jun. 12, 2006  (DE) .......................... 10 2006 027 224

(51) Int. Cl.
*H02P 9/04*    (2006.01)
(52) U.S. Cl. ............................................. 290/44; 290/55
(58) Field of Classification Search .................... 290/44, 290/55; 700/19, 22, 287; 415/4.2, 4.3
See application file for complete search history.

(56) References Cited

U.S. PATENT DOCUMENTS

| | | | | | |
|---|---|---|---|---|---|
| 2,363,850 | A | * | 11/1944 | Bany | 290/44 |
| 4,095,120 | A | * | 6/1978 | Moran et al. | 290/44 |
| 4,198,572 | A | * | 4/1980 | Kant | 290/44 |
| 2009/0001726 | A1 | * | 1/2009 | Warfen et al. | 290/44 |
| 2010/0148506 | A1 | * | 6/2010 | Letas | 290/44 |

FOREIGN PATENT DOCUMENTS

| | | |
|---|---|---|
| DE | 29722109 | 3/1998 |
| DE | 19651364 | 6/1998 |
| DE | 10335575 | 3/2005 |
| WO | WO-02/05406 | 1/2002 |

OTHER PUBLICATIONS

International Search Report and Written Opinion mailed Nov. 23, 2007 directed towards counterpart international application No. PCT/EP2007/005180; 8 pages.

* cited by examiner

*Primary Examiner* — Dang D Le
(74) *Attorney, Agent, or Firm* — Morrison & Foerster LLP

(57) ABSTRACT

A wind energy installation is provided with a generator driven by a rotor with adjustable rotor blades to produce electrical energy, with a pitch adjustment device to adjust the blades, which pitch adjustment device includes an emergency circuit with an energy store to actuate a blade actuating motor. A shunt branch is provided with a current-balancing device in parallel with the energy store, the current balancing device configured to control the current shunt branch depending on a feedback current from the blade actuating motor. A current balancing circuit is provided with which the feedback current occurring in the overrunning state is dissipated in controlled fashion via a shunt branch and therefore the electrical energy store is protected from a damaging feedback current. This prevents a damaging rise in the voltage of the electrical energy store and a rise in the motor speed of the blade actuating motor during overrunning operation.

19 Claims, 5 Drawing Sheets

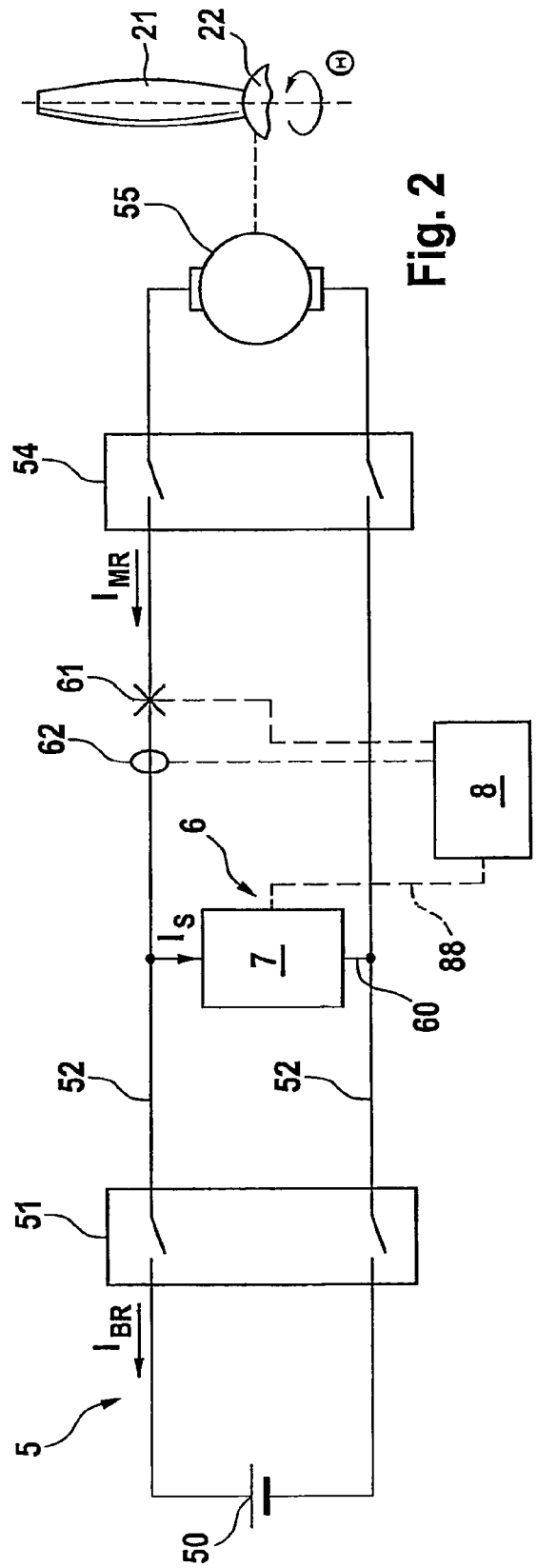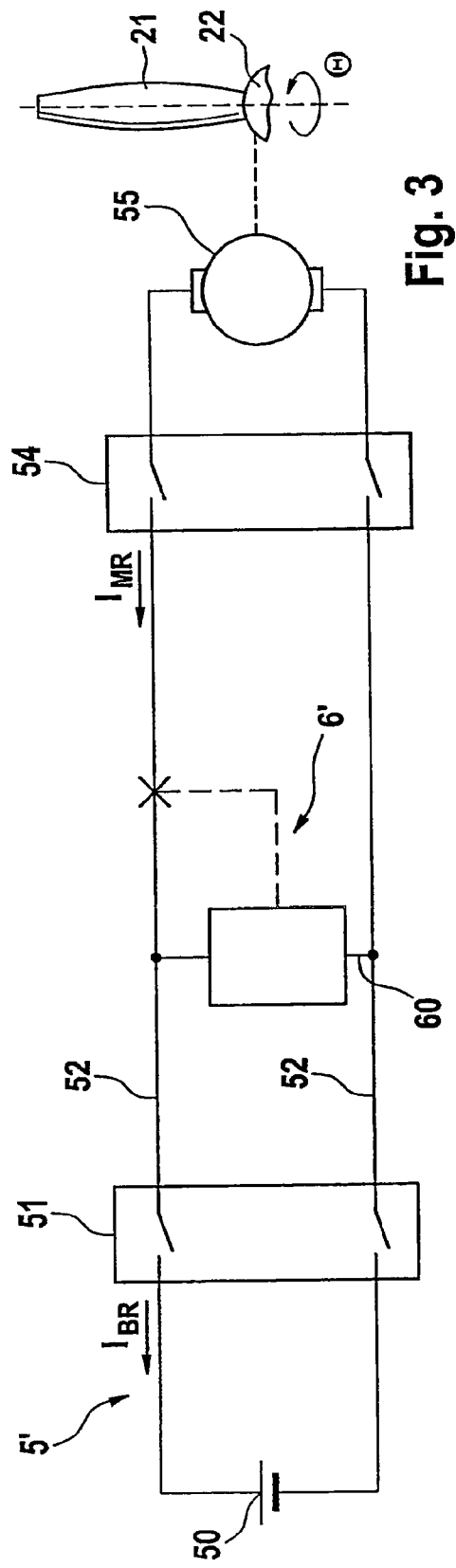

WIND ENERGY INSTALLATION WITH AN AUTONOMOUS ENERGY SUPPLY FOR A BLADE ADJUSTMENT DEVICE

REFERENCE TO RELATED APPLICATIONS

This application is a national stage application under 35 USC 371 of International Application No. PCT/EP2007/005180, filed Jun. 12, 2007, which claims the priority of German Patent Application No. 10 2006 027 224.2, filed Jun. 12, 2006, the contents of which are incorporated herein by reference in their entirety.

FIELD OF THE INVENTION

The invention relates to a wind energy installation having a generator which is driven by a rotor with variable-pitch blades for production of electrical energy, with a pitch adjustment device being provided for adjustment of the blades, which device has an emergency circuit with an electrical energy store for operation of the blades by means of a blade pitch control motor.

BACKGROUND OF THE INVENTION

For safety reasons, wind energy installations with variable-pitch rotor blades are generally designed to adjust the rotor blades by means of an autonomous energy store even when the power supply system fails. In order to make it possible to safely stop the wind energy installation in a situation such as this, an emergency drive apparatus is provided. DE-B-103 35 575 discloses a pitch adjustment drive having an emergency drive device which has a rechargeable battery as an independent electrical energy store for the pitch adjustment drive. The rechargeable battery is connected to a converter in such a way that, in the event of a fault, the rechargeable battery is connected to the converter by means of a switch, thus providing the power required to operate the motor. However, it has been found that, during operation of the emergency drive device, certain load states can occur in which the rotor blade whose pitch is to be adjusted drives the motor. This then results in overrunning. In this case, electrical power is produced in the blade pitch control motor, thus resulting in the risk of the electrical power that is produced being fed back into the rechargeable battery. Feedback such as this is undesirable for a number of reasons, and can lead to damage. High charging currents can occur during feedback, for which the rechargeable battery is unsuitable. In general, the internal resistance of a rechargeable battery while being charged is higher than while it is being discharged, as a result of which dangerously high battery voltages can occur during charging and in particular during undesirable charging with high charging currents. A further damaging effect is that, when feedback occurs, this can lead to a rise in the no-load rotation speed of the blade pitch control motor. This leads to a shift in the characteristics and increases the loads acting in the pitch adjustment device and on the blades.

It has been proposed to use a chopper device to destroy the electrical power that is produced by the blade pitch control motor when overrunning, and in this way to protect the rechargeable battery against damaging high-current charging. In order to control the braking chopper, the voltage or the current flowing in the emergency circuit can be measured. However, it has been found that, during voltage-controlled operation, the problems of excessively high charging current cannot be coped with safely in all operating states.

SUMMARY OF THE INVENTION

The invention is based on the object of improving the protection of the electrical energy store in a wind energy installation of the type mentioned initially.

The solution according to the invention resides in the features as broadly disclosed and advantageously in accordance with the detailed embodiments disclosed below.

In a wind energy installation having a generator, which is driven by a rotor with variable-pitch blades, in order to produce electrical energy, with a pitch adjustment device being provided for adjustment of the blades, in which an emergency circuit is connected to an electrical energy store for operation of the blades by means of the energy store, or is passed to ground or to some other suitable current sink.

If overrunning occurs as a result of the aerodynamic forces acting on the blades when the rotor blade pitch is adjusted quickly, particularly to its safe windmilling position, then the blade pitch control motor acts as a generator. It therefore produces a current which effectively flows backwards via the emergency circuit to the electrical energy store. However, the current does not reach the electrical energy store but bypasses it by means of the shunt path. The essence of the invention is the idea of determining the magnitude of the current passing the shunt path such that it corresponds to the current produced by the blade pitch control motor when overrunning. The invention achieves this by the current mirror device. This results in the capability to reduce to zero the current which is fed back into the electrical energy store, and which corresponds to the difference between the current produced by the blade pitch control motor and the current carried away via the shunt path. This is achieved by no feedback current flowing back into the battery. The idea of the current mirror in the shunt path on which the invention is based therefore ensures in a surprisingly simple manner that the electrical energy store is safely protected against feedback currents.

In this case, in its simplest form, the current mirror device can be designed such that it has an input and an output, with a determining device for the feedback current of the blade pitch control motor being connected to the input, and its output determining the current through the shunt path. This allows the current mirror device to be formed in a simple manner from passive components. This not only reduces the required production effort but also, thanks to the low level of complexity, allows high reliability in operation.

However, alternatively or additionally, it is also possible for the current mirror device to be provided with an active controller. For this purpose, the current mirror device is expediently designed such that it has a controllable switching element in series with a load element, which controllable switching element is operated by means of a special controller. When the switching element is operated by the controller, it switches on, as a result of which the current can flow through the load element in the shunt path; when the switching element is not operated, it opens and the current flow in the shunt path is interrupted. The controller need not necessarily be in the form of a physically separate unit but can also just as well be integrated in an already existing control unit, for example a system management control unit which is generally provided in any case.

The controller may expediently have a clock generator which, in particular, may be in the form of a pulse-width modulator (PWM). This allows an operating signal for the switching element to be generated in a simple manner. For example, in particular, a pulse-width modulator makes it possible to operate the switching element at a fixed frequency of, for example, 4 kHz, and via the duty ratio, to determine the current to be carried away via the shunt path. There is therefore a linear relationship between the duty ratio of the pulse-width modulator and the current in the shunt path. A linear transfer function such as this is particularly advantageous when additional control processes are provided.

A determining device for the feedback current is expediently connected to the controller. In this case, this is generally a measurement sensor for the current of the blade pitch control motor. However, the possibility should not be excluded of a measure being formed for indirect determination of the feedback current instead of direct measurement of the current in the course of calculation from other variables which it may be possible to measure more easily, such as a difference voltage. According to one preferred embodiment of the invention which may be used for independent protection, the controller provides additional functions which go beyond a pure current mirror function. In this variant of the invention, which is referred to as a "modified current mirror", it is possible in particular to provide for the transfer function of the current mirror to have an offset or for its gradient to be variable. An offset module can expediently be provided for this purpose which is designed to set a basic current through the shunt path during emergency operation. In this case, a basic current means the current which flows irrespective of whether or not the blade pitch control motor is being driven, and thus produces feedback current. In this case, emergency operation means the operating mode in which the electrical energy storage device produces the electrical energy for operation of the blade pitch control motor. The basic current which is produced by the offset module has the effect that some power is always consumed during emergency operation, thus reducing the voltage of the electrical energy store. In particular, this has the consequence that the voltage resulting from the end-of-charge voltage is quickly reduced to the rated voltage. This creates an additional buffer range which protects the electrical energy store from overvoltage if current is fed back as a result of the blade pitch control motor being driven.

In order to avoid an undesirable load on the electrical energy store, particularly in situations such as these, in which the blade pitch control motor has to apply a large amount of power in order to adjust the blades, a blanking device can expediently be provided which is designed to reduce the basic current when the blade pitch control motor is on full load. Reducing the basic current, which can be reduced to a value of zero, means that, in situations such as these, the entire current which is produced by the electrical energy store flows into the blade pitch control motor and thus produces the maximum power.

It is also expediently possible to provide for the controller to have a gradient control module which is designed to linearly amplify the mirror current in the shunt path. This makes it possible to increase the ratio between the current in the shunt path and the feedback current from the blade pitch control motor. This makes it possible to create buffers to compensate for tolerances which can result from the feedback current not being optimally determined. In particular, this also makes it possible to use lower quality measurement devices for determining the feedback current, or to generate the feedback current indirectly from other measurement variables which are expediently available in any case.

The controller can preferably also have a threshold value module which is designed to operate the switching element such that an adjustable maximum current in the shunt path is not exceeded. This means that overloading of components in the shunt path can be reliably prevented, even in the extreme case. The risk of failure of the current mirror according to the invention and the risk resulting from this of premature failure of the electrical energy store or an undesirable characteristic change for pitch adjustment during emergency operation can thus be avoided.

The controller furthermore expediently has a compensation module for the energy store, which is designed to modify the mirror current as a function of its state of charge. If a resistor is provided as the load element in the shunt path, then the current flowing through it is dependent not only on the operation of the switching element but also on the voltage of the electrical energy store. When the battery voltage is falling, this leads to a corresponding reduction in the current in the shunt path. The compensation module is provided in order to prevent an excessively low current from flowing in the shunt path, and changes the operating signal for the switching element as a function of the actual voltage such that a higher current is achieved in the shunt path. Ideally, the compensation module is adjusted such that the current in the shunt path is independent of the actual voltage of the electrical energy store. A voltage measurement device is provided, preferably on the electrical energy store, in order to make this possible.

The controller preferably also has a protective module which is designed to reduce the mirror current as a function of a load state of the load element. The electrical power carried in the shunt path and which is dissipated by the load element is dependent on the square of the current. Particularly at high current levels, this results in a major rise in the electrical power to be absorbed. This can lead to overloading of the components in the shunt path, particularly of the load element. In particular, there is the risk of thermal overloading, which can easily result in a failure of the load element and therefore failure of the shunt path. In order to avoid this, the protective module monitors the load state of the load element and, if necessary, ensures that the current in the shunt path is reduced. A temperature measurement device is expediently provided in order to monitor the load element. This is the case in particular when the load element is in the form of a braking resistor. This provides a simple and direct measurement capability for the load state. Alternatively, however, it is also possible to provide an estimation device for the load state in order to avoid additional sensor systems. This is designed to determine a measure for the thermal load state of the energy store from a voltage signal from the electrical energy store and from the output signal from the controller. In order to allow the load state of the load element to be determined better not only in the case of load peaks which occur briefly but also in the case of loads occurring over a relatively long time, the estimation device expediently has a low-pass filter element whose time constant is chosen such that it corresponds to the thermal time constant of the load element. This allows an integration function to be provided in a simple and expedient manner in order to allow the load to be borne by the load element to be detected even over a relatively long time period. A comparison device is preferably also provided, to one of whose inputs an output of the low-pass filter element is applied, and to whose other input a temperature limit value signal is applied. It is designed to output an output signal when the limit temperature is exceeded, as a result of which the protective module reduces the current through the shunt path, or even decreases it to zero.

The invention also relates to a method having the features of the independent method claim. Reference should be made to the above statements in order to explain the method of operation.

BRIEF DESCRIPTION OF THE DRAWINGS

The invention will be explained in the following text with reference to the attached drawing, in which advantageous exemplary embodiments are illustrated, and in which:

FIG. 2 shows a schematic view of a pitch adjustment device according to a first exemplary embodiment;

FIG. 3 shows a schematic view of a pitch adjustment device according to a second exemplary embodiment;

DETAILED DESCRIPTION OF THE INVENTION

Figure 1:
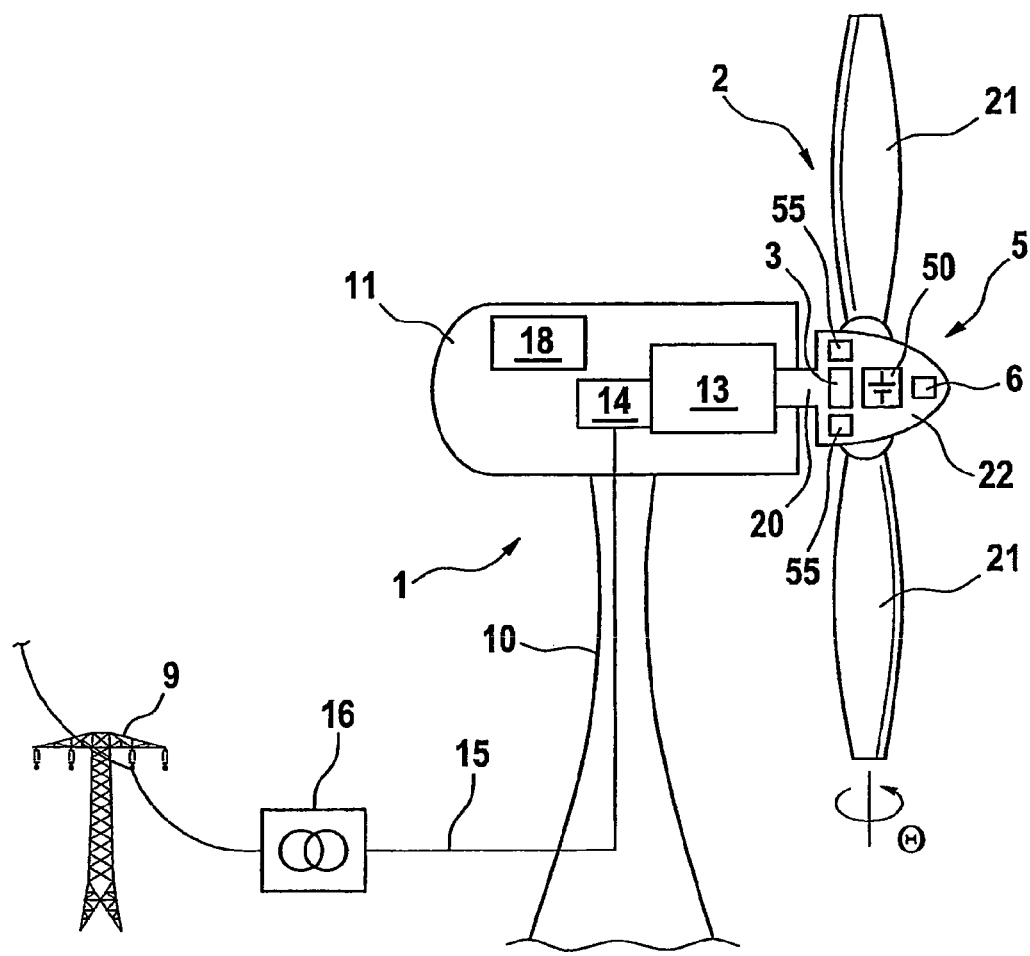
FIG. 1 shows a schematic view of a wind energy installation according to the invention.
Figure 6:
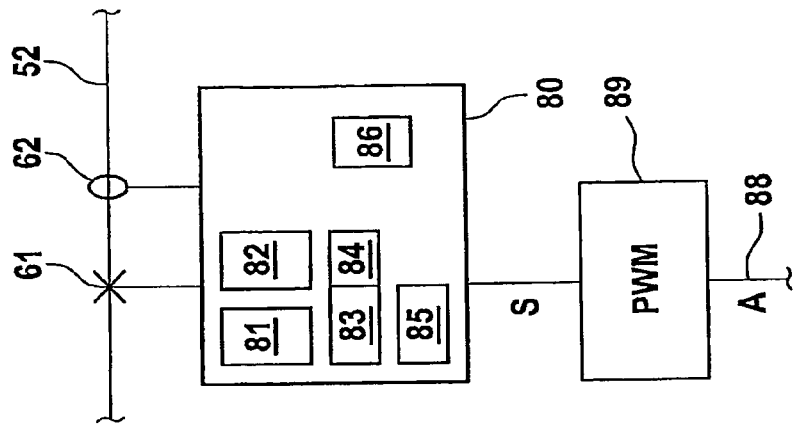
FIG. 6 shows a schematic view of a controller for the second exemplary embodiment.
Figure 5:
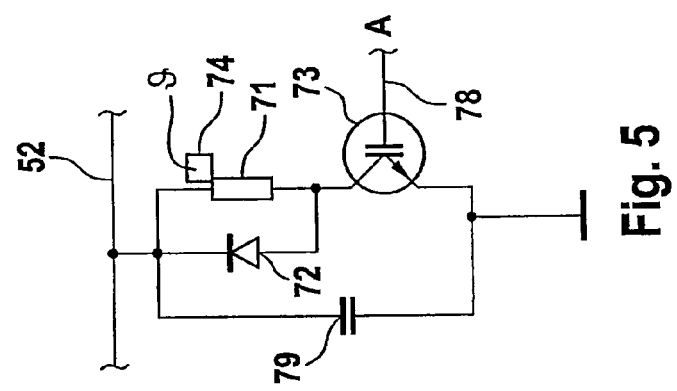
FIG. 5 shows a current mirror device according to the exemplary embodiment illustrated in FIG. 2.

A wind energy installation according to the invention, annotated in its entirety by the reference number 1, comprises a tower 10 with a pod 11 arranged at its upper end such that it can rotate on the azimuth plane. A rotor 2 is arranged on one end face of the pod 11, such that it can rotate about a rotor shaft 20. The rotor 2 comprises a plurality of rotor blades 21 (2 in the illustrated example). A rotor blade hub 22 connects the rotor blades 21 to the rotor shaft 20, which drives a generator 13, which is arranged in the pod 11, in order to produce electrical energy. The electrical energy is passed to a converter 14 and is output to an electrical grid system 9 via a three-phase line (only one phase of which is illustrated) 15 and a transformer 16. A control device 18 for the wind energy installation 1 is furthermore also arranged in the pod 11 and is used in a manner known per se for system management of the wind energy installation.

The rotor blades 21 are arranged on the hub 22 in such a way that their pitch angle θ is adjustable. A pitch adjustment device 3 is provided in order to adjust the pitch angle and comprises blade pitch control motors 55 which are arranged in the region of the root of the respective rotor blade 21. The pitch adjustment device has an emergency pitch adjustment module 5 which is designed to provide emergency pitch adjustment for the rotor blades 21 even in the event of failure of the grid system 9 or in the event of a fault in the power supply to the rotor blade hub 22. In order to provide sufficient electrical power, an autonomous electrical energy store is provided in the rotor blade hub 22, and in the illustrated exemplary embodiment is in the form of a rechargeable battery 50.

The design and method of operation of the pitch adjustment device during emergency operation will now be explained with reference to FIG. 2. The pitch adjustment device, which is annotated in its totality with the reference number 5, for emergency operation comprises a battery contactor 51 via which the rechargeable battery 50 is connected to connecting lines 52, and further via a motor contactor 54 to the blade pitch control motor 55. The invention provides for the pitch adjustment device 5 to be operated as follows during emergency operation. Electrical energy which is provided by the rechargeable battery 50 flows via the battery contactor 51 and the connecting lines 52 to the motor contactor 54, and to the blade pitch control motor 55. The motor, through which current is passed in this way, rotates the rotor blade 21 associated with it (or a plurality of rotor blades 21 associated with it in the case of a central pitch motor), to be precise generally to the windmilling position of the rotor blades 21, which is intended to stop the wind energy installation. Aerodynamic loads can be produced because of the wind forces acting on the rotor blades 21, resulting in the rotor blade 21 being moved more quickly in the direction of the windmilling position than corresponding to the rotation speed of the blade pitch control motor 55. In consequence, the blade pitch control motor 55 starts to overrun. While overrunning in this way, it acts like a generator and can produce a current which is illustrated as the motor current $I_{MR}$ in FIG. 2. Conventionally, this motor current which is produced by the blade pitch control motor 55 during overrunning would be passed via the connecting lines 52 and the battery contactor 51 into the rechargeable battery 50, thus resulting in the rechargeable battery 50 being charged. Since these may be relatively high currents, there is the risk of damaging high-current charging of the rechargeable battery 50. There is also the risk during overrunning of magnetic saturation occurring in the blade pitch control motor 55, which would result in its operating characteristic being shifted such that its no-load rotation speed would rise undesirably.

In order to avoid this, the invention provides a current mirror device 6, which is switched such that a shunt path 60 is connected between the connecting lines 52. The current mirror device 6 is arranged in the shunt path 60. The design and method of operation of the current mirror device 6 will be explained in more detail in the following text.

Figure 4:
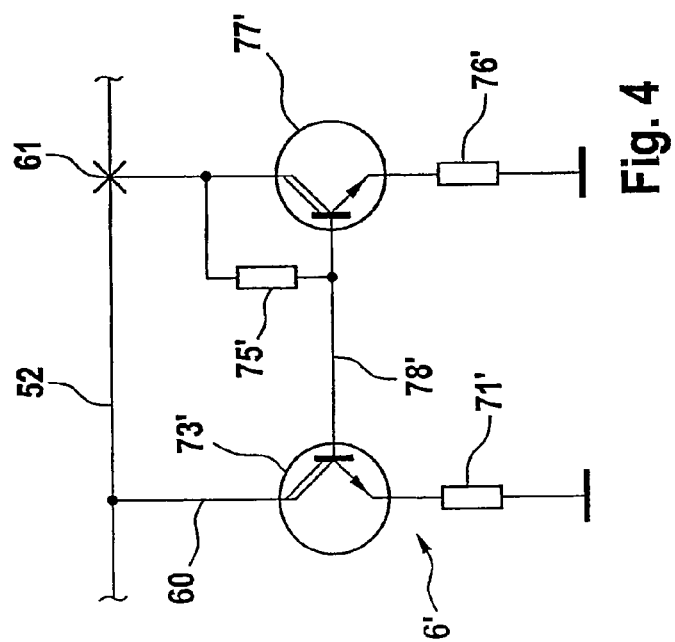
FIG. 4 shows a current mirror device according to the exemplary embodiment illustrated in FIG. 3.

A particularly simple version, but which is completely adequate for the purpose according to the invention, of a current mirror device with passive components as illustrated in the basic layout in FIG. 3 and in detail in FIG. 4 will be used for explanatory purposes. A passive current mirror device 6' such as this comprises only resistors and transistors. The motor feedback current flowing via the connecting line 52 is measured by means of a current sensor 61. It is expedient for the current sensor 61 to be in the form of a transformer with a transformation ratio of 500:1. By way of example, if the motor feedback current is 50 A, it produces a control current of 0.1 A. The measurement sensor 61 is connected to a collector of a transistor 77', whose emitter is connected to ground via a resistor 76'. A resistor 75' which leads to the collector, as well as a control connection 78', are connected to a base of the transistor 77'. This circuit results in a voltage which is dependent on the current of the measurement sensor 61 being produced at the control connection 78'. A switching transistor 73' is also provided and is preferably in the form of a Darlington power transistor (for balancing reasons, the transistor 77' is expediently likewise a Darlington power transistor). The collector of the switching transistor is connected to the connecting line 52, and its emitter is connected via a load resistor 71' to ground. The collector-emitter path through the switching transistor 73' therefore forms a shunt path 60 for the rechargeable battery 50. The control connection 78' is connected to the base of the switching transistor 73'. The transistor 77' and the switching transistor 73' therefore have a common base potential. The load resistor 71' has a resistance value with respect to the resistor 75' corresponding to the inverse of the transformation ratio. With the above transformation ratio of 500:1 and using, by way of example a resistance of 50 ohm for the resistor 76', this means that the load resistor 71' has a value of 0.1 ohms. The current mirror device 6' illustrated in FIG. 4 is a conventional current mirror circuit which is designed such that its branch which contains the transistor 77' detects the motor current $I_{MR}$ produced by the blade pitch control motor 55 when it is overrunning, and carries away a current $I_S$ of equal magnitude via the shunt path 60, via the other branch which contains the load transistor 73' Ideally, this means that all of the current which is produced by the blade pitch control motor 50 when it is overrunning is carried away via the shunt path 60, thanks to the current mirror device 6'. No current therefore flows to the rechargeable battery 50, that is to say the current $I_{BR}$ is zero. The rechargeable battery 50 is therefore protected against undesirable high-current charging by the blade pitch control motor 55 when it is overrunning. Furthermore, the process according to the invention of carrying away the current that is produced by the blade pitch control motor 55 when it is overrunning means that the voltage between the connecting lines 52 and therefore the voltage on the blade pitch control motor 55 does not rise during overrunning, either. This avoids the undesirable increase in the no-load rotation speed of the blade pitch control motor 55 when overrunning, as a result of magnetic saturation phenomena.

In many cases, a simple current mirror device 6' such as this, and as illustrated in FIG. 3, is adequate for protection of the rechargeable battery 50 and in order to maintain advantageous operating characteristics during emergency operation. According to one particularly advantageous aspect of the invention, which may be used for independent protection, it is, however, also possible to provide an extended current mirror device 6. This comprises an active controller 8 which operates a switching element 7 which is arranged in the shunt path 60. It should be noted that the controller 8 need not necessarily be in the form of a separate unit but can just as well be integrated in a control device, which is already provided, for system management 18.

First of all, the design of the switching element 7 will be explained. Along the shunt path 60, this comprises a load resistor 71 and a semiconductor switch 73 which is arranged in series with it and is preferably in the form of an IGBT. A freewheeling diode 72 is also provided across the load resistor 71, for protection against voltage spikes. Furthermore, a capacitor 79 is provided and is used to make the current, which is clocked by the semiconductor switch, uniform. The load resistor 71 is used on the one hand, to dissipate the electrical power passed through the shunt path 60, and on the other hand for protection of the semiconductor switch 73 against overloading. This means that the value of the load resistor 71 must be chosen to be at least sufficiently high that the maximum permissible current through the semiconductor switch 73 is not exceeded at the maximum voltage of the rechargeable battery 50. On the other hand, the resistance must be chosen to be sufficiently small that a minimum current is still achieved in the shunt path 60 even when the voltage of the rechargeable battery 50 is reduced. A resistance value of $R=10\Omega$ has been proven for a pitch adjustment device with a rechargeable battery with an end-of-charge voltage of 320 V and an internal resistance of $0.5\Omega$. The IGBT which is used as the semiconductor switch 73 has a control connection 78, to which the control device of the extended current mirror device 6 is connected.

The controller 8 has a main module 80 and, as an output stage, a clock generator which is preferably in the form of a pulse-width modulator 89. The output of the pulse-width modulator 89 passes an output signal A via a connecting line 88 to the control input 78 of the semiconductor switch element 73. The pulse-width modulator 89 is designed to produce a clock signal of a frequency of, for example, 4 kHz for a normalized control signal S (which may assume values between 0 and 1), and to vary the duty ratio of the clock signal between 0 and 100% as a function of the magnitude of the normalized control signal. In this case, the pulse-width modulator 89 preferably carries out a linear conversion process. A measurement sensor for the motor feedback current 61 and a measurement sensor for the voltage 62 are each provided as an input signal to the main module 80. The main module 80 operates in such a way that it determines the control signal S for the pulse-width modulator 89 based on the current value measured by the sensor 61, in which case various correction factors can be taken into account. One correction factor is the setting of an offset. An offset module 83 is provided for this purpose. The use of the offset module 83 to set an offset means that a specific current (the offset current) flows through the shunt path 60 even when the blade pitch control motor 55 is not overrunning. The offset current results in a defined load on the rechargeable battery 50, and this has the desirable effect that the voltage across the rechargeable battery 50 can be reduced quickly from the comparatively high end-of-charge voltage to the rated voltage. The rated voltage forms a stable operating point for the rechargeable battery 50, since the voltage decreases only slowly as the rechargeable battery 50 is progressively discharged. A blanking module 84 expediently interacts with the offset module 83 and is designed to reduce the offset current when there is a high load on the rechargeable battery 50, to be precise if necessary down to a value of zero. This ensures that the full power of the rechargeable battery 50 is available when it is required to drive the blade pitch control motor 55.

Furthermore, a gradient control module 85 is provided and is used to linearly vary the ratio of the mirror current in the shunt path 60 with respect to the feedback current produced by the blade pitch control motor 55. Normally, this change results in an increase in the mirror current, although a reduction should not be completely precluded. An increase in the mirror current by means of the gradient control module 85 makes it possible to produce a buffer for tolerances relating to the measurement of the feedback current or other variables. This ensures that, even under the influence of tolerances or measurement inaccuracies, the current in the shunt path is always sufficiently high to absorb the feedback current produced by the blade pitch control motor 55. This ensures, even in difficult circumstances, that the rechargeable battery 50 is not charged by the feedback current.

Furthermore, a compensation module 82 can be expediently provided, and is designed to introduce a correction factor into the calculation of the control signal, in order to compensate for fluctuations in the instantaneous voltage of the rechargeable battery 50. This makes it possible to compensate for fluctuations in the current in the shunt path 60 caused by a change in the voltage of the rechargeable battery 50. In order to detect the voltage of the rechargeable battery 50, the compensation module 82 is expediently connected to the voltage sensor 62.

Furthermore, a protective module 81 can be provided in the main module 80, and is designed to reduce the current in the shunt path 60 as a function of a load state of the load resistor 71. For this purpose, a temperature sensor 74 may be arranged on the load resistor. If the temperature on the load resistor 71 threatens to exceed an impermissibly high level, which would thus lead to overloading on the load resistor 71, then the protective module 81 is used to limit the mirror current in the shunt path 60, if necessary. This is based on the knowledge that it may be better to accept a temporary reduction in the mirror current than to risk a failure of the mirror device overall as a result of destruction of the load resistor 71.— However, it is not absolutely essential to use a costly temperature sensor 74 for the load resistor 71. It is also possible to provide for the load state of the load resistor 71 to be estimated from previous measurement variables. An appropriate estimation device 86 can be provided for this purpose.

Figure 7:
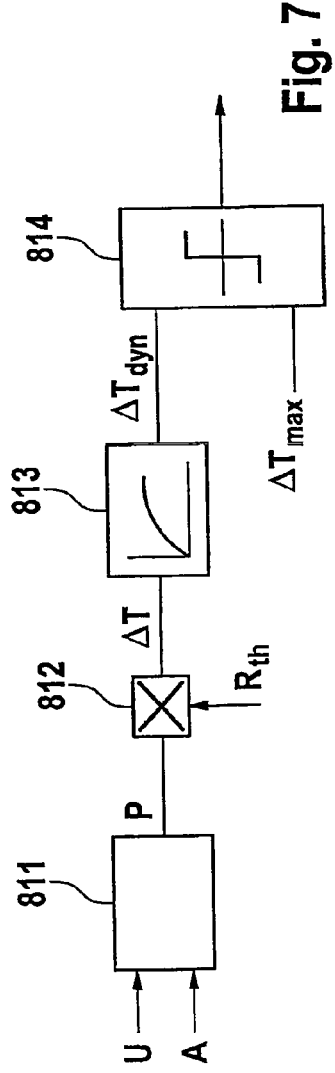
FIG. 7 shows a schematic view of a protective module.

FIG. 7 illustrates a schematic diagram which comprises a measurement of the voltage of the rechargeable battery 50, preferably by means of the measurement sensor 62, and also detection of the operating signal A by means of the switching element 73, for example of the line 88. Based on these input variables, a calculation unit 811 determines a power signal, for example by squaring the measured voltage divided by the value of the load resistor 71 multiplied by the duty ratio of the operating signal A. This is a measure of the power dissipated in the load resistor 71. A temperature difference signal $\Delta T$ can be determined by means of a multiplication element 812, taking account of a parameter for the thermal resistance. This is a measure of the theoretically resulting steady-state temperature increase. A low-pass filter element 813 can be provided in order to take account of the dynamics, and takes into account the thermal time constant of the load resistor 71. A measure of the dynamic temperature increase is then produced at its output and is applied to one input of a comparator 814, to whose other input a measure of the maximum permissible limit temperature increase $\Delta T_{max}$ is applied. If the actual dynamic temperature increase exceeds this limit value, then the comparator outputs a signal which causes the protective module 81 to trip. No additional temperature sensors 74 are required for the load resistor 71 when using this calculation.

Figure 8:
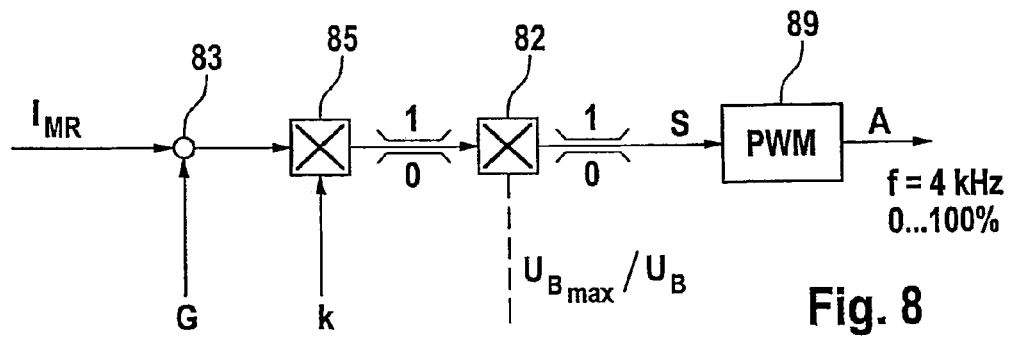
FIG. 8 shows a functional illustration of the control process.

The fundamental method of operation of the main module 80 is illustrated in a summarized form in FIG. 8. A measure of the motor feedback current $I_{MR}$ is used as an input variable. An additionally flowing basic current G in the shunt path 60 is added by means of the offset module 83. A gain factor k for the current mirror characteristic is set by means of the gradient control module 85. If normalized variables are used for the calculation, then limiting is carried out in the range between 0 and 1. Any reduction in the voltage from the rechargeable battery 50 starting from the rated voltage is taken into account by means of the compensation module 82. This results in an increase in the control signal S and thus in the operating signal A when the voltage of the rechargeable battery 50 falls. After limiting to the range 0 to 1 again, an output signal S of the main module 80 is formed and is applied to the input of the pulse-width modulator 89. This uses the normalized control signal S to form a fixed-frequency operating signal A, whose duty ratio is governed by the magnitude of the control signal.

The following text will make use of various characteristics in order to explain the way in which the extended current mirror according to the invention can be operated with and without consideration of the additional modules.

Figure 9:
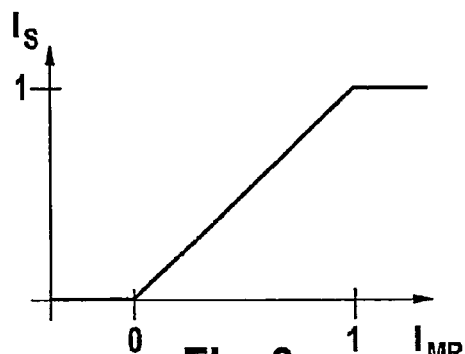
FIGS. 9 to 11 show characteristics for differently set current mirror devices.

FIG. 9 shows the characteristic of the pure current mirror, as results, for example, for the simple embodiment shown in FIG. 3. The motor feedback current $I_{MR}$ is shown as a normalized value on the abscissa, and the current $I_S$ in the shunt path is shown, likewise as a normalized value, on the ordinate. If no feedback current $I_{MR}$ is flowing, its value is therefore 0 or less and, in a corresponding manner, the mirror current through the shunt path 60 is likewise 0. When the feedback current $I_{MR}$ rises, then the mirror current $I_S$ flowing through the shunt path 60 therefore increases linearly until, finally, the norm value is in each case reached. Even this basic function of the current mirror ensures protection of the rechargeable battery 50 against damaging high-current charges during overrunning.

Figure 10:
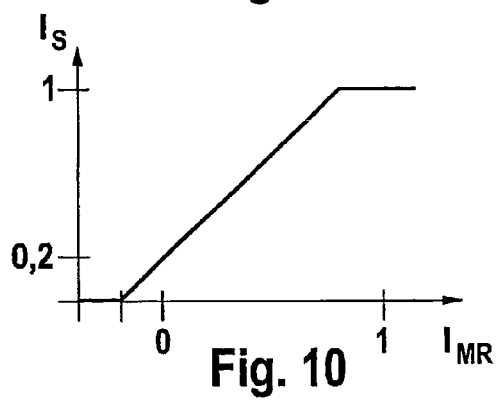

FIG. 10 shows a characteristic for an extended current mirror as shown in FIG. 2. As in FIG. 9, the motor feedback current and the current in the shunt path are illustrated in a normalized form. In addition, the offset module 83 is provided and shifts the characteristic to the left on the graph. This means that, even when the motor feedback current $I_{MR}$ is 0, a current with a magnitude of 0.2 (a normalized current in the illustrated example) already flows in the shunt path 60. If a motor feedback current also occurs, then the current in the shunt path 60 is increased correspondingly linearly, by virtue of the current mirror device 6.

Figure 11:
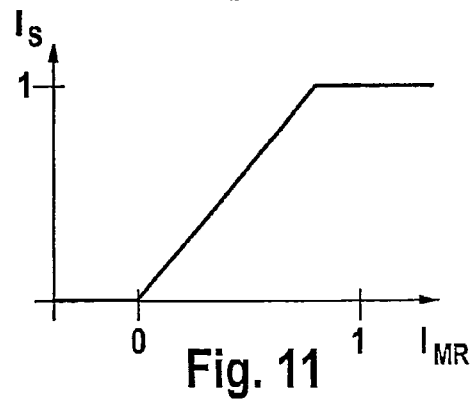

FIG. 11 shows another variant. As in FIG. 9, the motor feedback current and the current in the shunt path are shown in a normalized form. The gradient control module 85 is additionally provided in this case. This leads to the mirror current being amplified by a constant factor when a motor feedback current occurs. More current therefore flows through the shunt path 60 than is produced by the blade pitch control motor 55 when overrunning. This means that no feedback current can flow to the rechargeable battery 50, even when tolerances are taken into account.

Figure 12A:
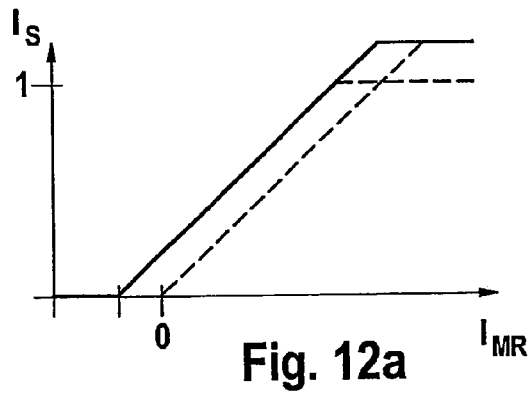
FIGS. 12a-12b show a pair of characteristics illustrating the current mirror characteristic and a corresponding operating signal.
Figure 12B:
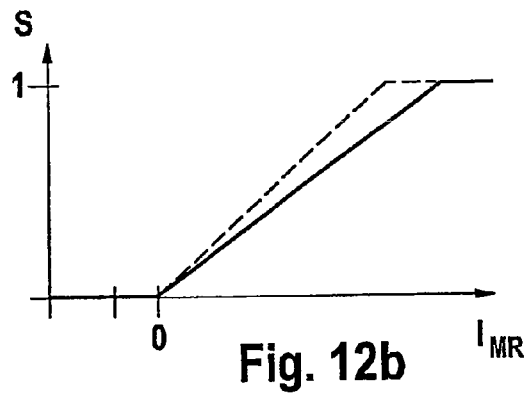

FIG. 12a) shows a characteristic which results when the offset module 83 and the compensation module 87 are taken into account. The offset module 83 results in the characteristic being shifted to the left (cf the dashed rising characteristic). Furthermore, the compensation module 81 is provided. This leads to the current being completely maintained in the shunt path 60 when the voltage of the rechargeable battery 50 is below the rated voltage, and not being reduced corresponding to the reduced voltage. FIG. 12b) shows the corresponding control signal S which is transmitted from the main module 80 to the pulse-width modulator 89. The solid line illustrates the situation when the voltage of the rechargeable battery 50 corresponds to the rated voltage, and the dashed line corresponds to the situation when the voltage is less.

Figure 13A:
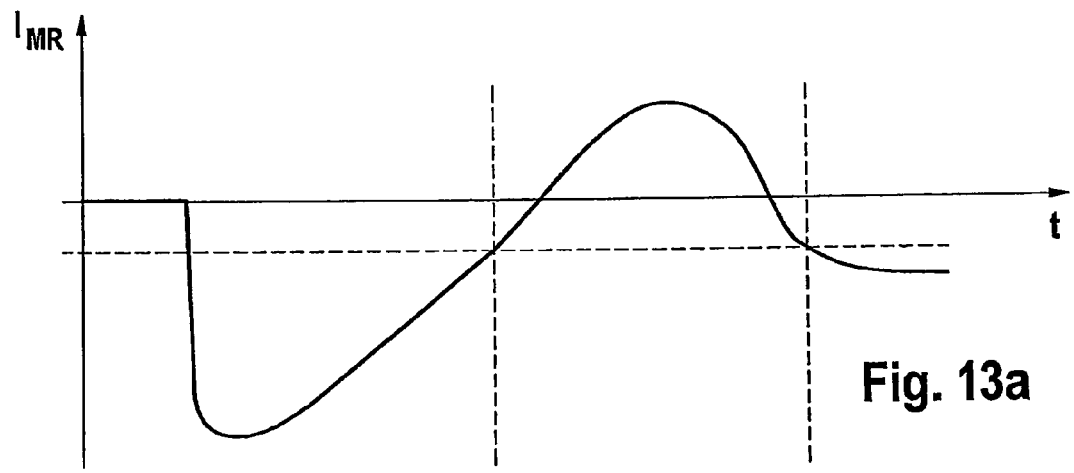
FIGS. 13a-13c show current characteristics in the emergency circuit.
Figure 13B:
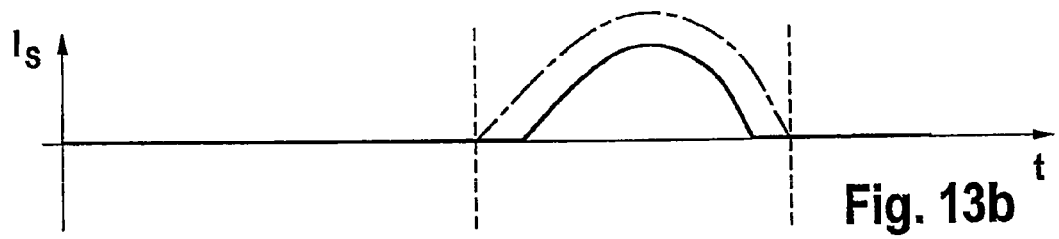
Figure 13C:
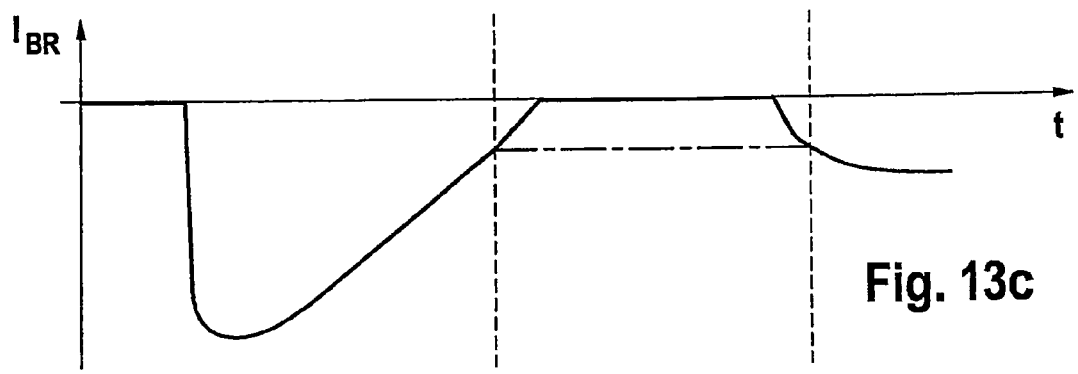

Finally, by way of example, FIGS. 13a-13c show the effect of the two embodiments illustrated in FIGS. 2 and 3. The solid line shows the embodiment as shown in FIG. 3 with a simple current mirror. As long as the blade pitch control motor 55 receives current from the rechargeable battery 50 (I.sub.MR is negative), no current I.sub.s flows in the shunt path 60 (see the solid curve in the left-hand section of figures a), b) and c)). A mirror current I.sub.S flows through the shunt path 60 only when the motor feedback current I.sub.MR becomes positive. The magnitude of this mirror current I.sub.S corresponds precisely to the positive component of the motor feedback current, as a result of which no current flows to the rechargeable battery 50 (see the central area in the graphs a), b) and c)).—The right-hand area corresponds to the left-hand area.

The dashed-dotted curve shows the current flow in the shunt path in the second embodiment as shown in FIG. 2. In this embodiment with the so-called "extended current mirror", the offset module 83 results in a basic current always flowing through the shunt path 60 when the blade pitch control motor 55 is producing a feedback current $I_{MR}$ when overrunning, or when the current $-I_{MR}$ driving the motor exceeds a magnitude of −0.2 of the normalized motor current. This ensures that a discharge current flows out of the rechargeable battery 50 even when the motor is overrunning.

The invention claimed is:

1. A wind energy installation having a generator which is driven by a rotor with variable-pitch rotor blades to produce electrical energy, with a pitch adjustment device to adjust the blades, which device has an emergency circuit with an electrical energy store to operate a blade pitch control motor, wherein a shunt path with a current mirror device is in parallel with the energy store, with the current mirror device being configured to control the current in the shunt path as a function of a feedback current of the blade pitch control motor.

2. The wind energy installation as claimed in claim 1, wherein the current mirror device has an input and an output, with a device configured to determine the feedback current of the blade pitch control motor being connected to the input, and with the output determining the current through the shunt path.

3. The wind energy installation as claimed in claim 1, wherein the current mirror device has a load element and a series-connected switching element which is operated by a special controller.

4. The wind energy installation as claimed in claim 3, wherein the controller has a pulse-width modulator.

5. The wind energy installation as claimed in claim 3 or 4, wherein the controller has a determining device for the feedback current of the blade pitch control motor.

6. The wind energy installation as claimed in claim 3, wherein the controller has an offset module which is configured to set a basic current in the shunt path during emergency operation.

7. The wind energy installation as claimed in claim 6, wherein the offset module has a blanking device which is configured to reduce the basic current when the blade pitch control motor is on full load.

8. The wind energy installation as claimed in claim 3 or 6, wherein the controller has a gradient control module which is configured to linearly amplify the current in the shunt path.

9. The wind energy installation as claimed in claim 3 or 6, wherein the controller has a compensation module which is configured to vary the mirror current in the shunt path as a function of the state of charge of the energy store.

10. The wind energy installation as claimed in claim 9, wherein the compensation module has a voltage measurement device configured to determine the state of charge of the electrical energy store.

11. The wind energy installation as claimed in claim 3 or 6, wherein the controller has a protective module which is configured to reduce the mirror current in the shunt path as a function of a load state of the load element.

12. The wind energy installation as claimed in claim 11, further comprising a temperature measurement device for the load element to determine the load state.

13. The wind energy installation as claimed in claim 11, further comprising an estimation device for the load state to determine a measure of the thermal load state from the voltage of the electrical energy store and from an output signal from the controller.

14. A method for operating a pitch adjustment device for blades of a rotor of a wind energy installation, with the rotor driving a generator to produce electrical energy, and with a blade pitch control motor being operated via an emergency circuit with an electrical energy store during emergency operation, comprising arrangement of a current mirror device in parallel with the electrical energy store in a shunt path and operation of the current mirror device to control the current in the shunt path as a function of a feedback current of the blade pitch control motor.

15. The method as claimed in claim 14, comprising operation of the current mirror in an extended mode, in which a basic current is set in the shunt path.

16. The method as claimed in claim 14 or 15, comprising linear amplification of the current in the shunt path.

17. The method as claimed in claim 14 or 15, comprising determination of the state of charge of the electrical energy store and increase of the current in the shunt path as a function of the state of charge.

18. The method as claimed in claim 14 or 15, comprising reducing the current in the shunt path as a function of a load state of the current mirror device.

19. The method as claimed in claim 18, comprising estimating the load state by determining a measure based on a voltage of the electrical energy store and on an output signal from a controller for the current mirror device.

* * * * *